(12) United States Patent
Wang et al.

(10) Patent No.: US 12,413,362 B2
(45) Date of Patent: *Sep. 9, 2025

(54) JOINT RESOURCE MAP DESIGN OF DM-RS AND PT-RS

(71) Applicant: Telefonaktiebolaget LM Ericsson (publ), Stockholm (SE)

(72) Inventors: Zhao Wang, Solna (SE); Lars Lindbom, Karlstad (SE); Vicent Molés Cases, Nules (ES); Karl Werner, Segeltorp (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/589,589

(22) Filed: Feb. 28, 2024

(65) Prior Publication Data

US 2024/0204945 A1 Jun. 20, 2024

Related U.S. Application Data

(63) Continuation of application No. 18/191,618, filed on Mar. 28, 2023, now Pat. No. 11,949,617, which is a
(Continued)

(51) Int. Cl.
*H04L 5/00* (2006.01)
*H04W 72/0446* (2023.01)
*H04W 72/12* (2023.01)

(52) U.S. Cl.
CPC .......... *H04L 5/0048* (2013.01); *H04L 5/0042* (2013.01); *H04L 5/0051* (2013.01); *H04W 72/0446* (2013.01); *H04W 72/12* (2013.01)

(58) Field of Classification Search
CPC ... H04L 5/0005; H04L 5/0007; H04L 5/0048; H04L 5/005; H04L 5/0051; H04L 5/0053;
(Continued)

(56) References Cited

U.S. PATENT DOCUMENTS 9,794,946 B2 10/2017 Li et al.
10,349,380 B2 7/2019 Park et al.
(Continued)

FOREIGN PATENT DOCUMENTS

CN 105122871 A 12/2015
CN 107800660 A 3/2018
(Continued)

OTHER PUBLICATIONS

Chinese Office Action and English Translation dated Oct. 29, 2021 for Application No. 201880039164.1, consisting of 17 pages.
(Continued)

*Primary Examiner* — Eric Nowlin
(74) *Attorney, Agent, or Firm* — Sage Patent Group

(57) ABSTRACT

A method, network node and wireless device in a wireless communication system for one of transmitting and receiving a phase-tracking reference signal, PT-RS. The method includes obtaining information about a position in a time domain of a scheduled first demodulation reference signal, DM-RS, in a slot, and one of transmitting and receiving the PT-RS within the slot, the position of the PT-RS depending on the position in the time domain of the scheduled first DM-RS.

14 Claims, 12 Drawing Sheets

Related U.S. Application Data continuation of application No. 16/073,680, filed as application No. PCT/SE2018/050629 on Jun. 15, 2018, now abandoned.

(60) Provisional application No. 62/521,078, filed on Jun. 16, 2017.

(58) Field of Classification Search
CPC ... H04L 7/0008; H04L 27/22; H04L 27/2613; H04L 2025/03796; H04L 2027/0067; H04W 72/0446; H04W 72/12
See application file for complete search history.

(56) References Cited

U.S. PATENT DOCUMENTS

| | | | |
|---|---|---|---|
| 10,368,334 | B2 | 7/2019 | Park et al. |
| 10,439,663 | B2 | 10/2019 | Islam et al. |
| 10,447,319 | B1 | 10/2019 | Lee et al. |
| 10,461,907 | B2 | 10/2019 | Lee et al. |
| 10,587,446 | B2 | 3/2020 | Lee et al. |
| 10,735,169 | B2 | 8/2020 | Kim et al. |
| 10,798,704 | B2 | 10/2020 | Akkarakaran et al. |
| 10,873,389 | B2 | 12/2020 | Bai et al. |
| 10,911,197 | B2 | 2/2021 | Wang et al. |
| 10,917,280 | B2 | 2/2021 | Kim et al. |
| 10,945,237 | B2 | 3/2021 | Yi et al. |
| 10,965,415 | B2 | 3/2021 | Lee et al. |
| 10,965,499 | B2 | 3/2021 | Lee et al. |
| 10,979,187 | B2 * | 4/2021 | Zhang ............ H04L 5/0064 |
| 11,082,150 | B2 | 8/2021 | Xu et al. |
| 11,108,605 | B2 | 8/2021 | Zhang et al. |
| 11,153,900 | B2 | 10/2021 | Kim et al. |
| 11,201,764 | B2 | 12/2021 | Zhang et al. |
| 11,212,031 | B2 | 12/2021 | Gao et al. |
| 11,277,238 | B2 | 3/2022 | Chen et al. |
| 11,418,379 | B2 | 8/2022 | Kim et al. |
| 11,452,132 | B2 | 9/2022 | Stern-Berkowitz et al. |
| 11,641,299 | B2 | 5/2023 | Davydov et al. |
| 11,652,586 | B2 | 5/2023 | Gao et al. |
| 11,870,629 | B2 * | 1/2024 | Kutz ............ H04L 5/0044 |
| 11,949,617 | B2 * | 4/2024 | Wang ............ H04W 72/12 |
| 2010/0322332 | A1 | 12/2010 | Zheng |
| 2013/0301757 | A1 | 11/2013 | Dao et al. |
| 2015/0003356 | A1 * | 1/2015 | Seo ............ H04L 5/0058 370/329 |
| 2015/0304080 | A1 | 10/2015 | Yi et al. |
| 2015/0358132 | A1 | 12/2015 | Wallen et al. |
| 2016/0262161 | A1 | 9/2016 | Li et al. |
| 2017/0294926 | A1 | 10/2017 | Islam et al. |
| 2018/0041321 | A1 | 2/2018 | Guo et al. |
| 2018/0167989 | A1 | 6/2018 | Yasukawa et al. |
| 2018/0270698 | A1 | 9/2018 | Babaei et al. |
| 2018/0270699 | A1 | 9/2018 | Babaei et al. |
| 2018/0270700 | A1 | 9/2018 | Babaei et al. |
| 2018/0270713 | A1 | 9/2018 | Park et al. |
| 2018/0270791 | A1 | 9/2018 | Park et al. |
| 2018/0270792 | A1 | 9/2018 | Park et al. |
| 2018/0317225 | A1 | 11/2018 | Akkarakaran et al. |
| 2018/0351719 | A1 | 12/2018 | Lee et al. |
| 2019/0074947 | A1 * | 3/2019 | Zhang ............ H04L 5/0048 |
| 2019/0081844 | A1 | 3/2019 | Lee et al. |
| 2019/0097776 | A1 | 3/2019 | Kim et al. |
| 2019/0098626 | A1 | 3/2019 | Yi et al. |
| 2019/0149295 | A1 | 5/2019 | Wang et al. |
| 2019/0165910 | A1 | 5/2019 | Lee et al. |
| 2019/0190682 | A1 | 6/2019 | Kadiri et al. |
| 2019/0215118 | A1 | 7/2019 | Moles Cases et al. |
| 2019/0222385 | A1 | 7/2019 | Hessler et al. |
| 2019/0254020 | A1 | 8/2019 | Nam et al. |
| 2019/0260466 | A1 | 8/2019 | Bai et al. |
| 2019/0296781 | A1 | 9/2019 | Lee et al. |
| 2019/0296877 | A1 | 9/2019 | Zhang et al. |
| 2019/0312697 | A1 | 10/2019 | Li et al. |
| 2019/0327056 | A1 | 10/2019 | Chen et al. |
| 2019/0341950 | A1 | 11/2019 | Lee et al. |
| 2019/0342046 | A1 | 11/2019 | Guo et al. |
| 2019/0349240 | A1 | 11/2019 | Saito et al. |
| 2020/0014513 | A1 | 1/2020 | Lee et al. |
| 2020/0021413 | A1 | 1/2020 | Park et al. |
| 2020/0021470 | A1 | 1/2020 | Sun et al. |
| 2020/0022135 | A1 | 1/2020 | Zhang et al. |
| 2020/0022172 | A1 | 1/2020 | Sun et al. |
| 2020/0052740 | A1 | 2/2020 | Zhang et al. |
| 2020/0052848 | A1 | 2/2020 | Gao et al. |
| 2020/0052944 | A1 | 2/2020 | Zhang et al. |
| 2020/0099465 | A1 | 3/2020 | Gao et al. |
| 2020/0162303 | A1 | 5/2020 | Kim et al. |
| 2020/0204335 | A1 | 6/2020 | Kim et al. |
| 2020/0244503 | A1 | 7/2020 | Bala et al. |
| 2020/0267722 | A1 | 8/2020 | Saito et al. |
| 2020/0287751 | A1 | 9/2020 | Lee et al. |
| 2020/0389270 | A1 | 12/2020 | Lee et al. |
| 2020/0403748 | A1 | 12/2020 | Yokomakura |
| 2021/0022117 | A1 | 1/2021 | Yi et al. |
| 2021/0105120 | A1 * | 4/2021 | Khoshnevisan ...... H04L 5/0091 |
| 2021/0184811 | A1 | 6/2021 | Lee et al. |
| 2021/0211257 | A1 | 7/2021 | Wang et al. |
| 2022/0006560 | A1 | 1/2022 | Xu et al. |
| 2022/0368584 | A1 * | 11/2022 | Kutz ............ H04L 27/3411 |
| 2023/0239188 | A1 | 7/2023 | Davydov et al. |

FOREIGN PATENT DOCUMENTS

| | | | |
|---|---|---|---|
| CN | 109075931 A * | 12/2018 | ............ H04B 7/04 |
| CN | 110463130 A | 11/2019 | |
| CN | 111034306 A | 4/2020 | |
| CN | 108347767 B | 1/2021 | |
| CN | 108809527 B | 7/2022 | |
| CN | 110870240 B | 8/2022 | |
| EP | 3565165 A1 | 11/2019 | |
| EP | 3681224 A1 | 7/2020 | |
| EP | 3681224 A4 | 6/2021 | |
| JP | 2020502904 A | 1/2020 | |
| JP | 2020516146 A | 5/2020 | |
| KR | 20190108153 A | 9/2019 | |
| KR | 102077044 B1 | 2/2020 | |
| RU | 2013112371 A | 9/2014 | |
| RU | 2729041 C1 | 4/2020 | |
| WO | 2013151395 A1 | 10/2013 | |
| WO | 2017026477 A | 2/2017 | |
| WO | 2017119720 A2 | 7/2017 | |
| WO | 2018182244 A1 | 10/2018 | |
| WO | 2019049938 A1 | 3/2019 | |
| WO | 2019051085 A1 | 3/2019 | |
| WO | WO-2022241376 A1 * | 11/2022 | ....... H04L 27/26136 |

OTHER PUBLICATIONS

Japanese Notice of Allowance and English Translation dated Nov. 16, 2021 for Application No. 2019-563081, consisting of 6 pages.
Korean Notice of Allowance and Machine English Translation dated Feb. 8, 2021 for Application No. 10-2019-7037118, consisting of 6 pages.
3GPP TSG RAN WG1 Meeting #89 R1-1708596; Title: Discussion on DL DMRS design; Agenda item: 8.1.2.4.2; Source: Qualcomm Incorporated; Document for: Discussion/Decision; Location and Date: Hangzhou, China, May 15-19, 2017, consisting of 13 pages.
Japanese Office Action with English Summary Translation dated Feb. 12, 2021 for Japanese Patent Application No. 2019563081, consisting of 6 pages.
3GPP TSG RAN WG1 Meeting #89 R1-1706937; Title: PTRS for CP-OFDM; Agenda Item: 7.1.2.4.3; Source: Huawei, HiSilicon; Document for: Discussion and decision; Date and Location: May 15-19, 2017, Hangzhou, China, consisting of 6 pages.
3GPP TSG-RAN WG1 #89 R1-1708997; Title: UL PTRS for DFTsOFDM waveform; Agenda Item: 7.1.2.4.3; Source: Mitsubishi Electric; Document for: Discussion/Decision; Date and Location: May 15-19, 2017, Hangzhou, China, consisting of 8 pages.
Russian Decision of Grant and English Translation for Application No. 2020101104/07 Filed on Jun. 15, 2018, consisting of 21 pages.

(56) References Cited

OTHER PUBLICATIONS

3GPP TSG-RAN WG1 #88b R1-1704656; Title: On phase and frequency tracking for DFTsOFDM; Source: Mitsubishi Electric; Agenda Item: 8.1.2.4.3; Document for: Discussion/Decision; Location and Date: Spokane, Washington, Apr. 3-7, 2017, consisting of 5 pages.
3GPP TSG RAN WG1#88 R1-1703182; Title: On PT-RS Design for NR; Agenda item: 8.1.2.4.3; Source: Nokia, Alcatel-Lucent Shanghai Bell; Document for: Discussion and Decision; Location and Date: Athens, Greece, Feb. 13-17, 2017, consisting of 7 pages.
National Instruments, Discussion on explicit and implicit signaling for PT-RS, May 19, 2017, 3GPP TSG RAN WG1 Meeting #89 Tdoc: R1-1708272 (Year: 2017); consisting of 11 pages.
Office Action dated Aug. 16, 2019 for U.S. Appl. No. 16/248,299, filed Jan. 15, 2019, consisting of 18 pages.
Office Action dated Mar. 14, 2019 for U.S. Appl. No. 16/248,299, filed Jan. 15, 2019, consisting of 31 pages.
Guo et al. "Tracking Reference Signal Design for Phase Noise Compensation for SC-FDMA Wavefom"; 17th IEEE International Conference on Communication Technology; 978-1-5090-3944; 2017.
3GPP TSG RAN WG1 Meeting #90 R1-17xxxxx; WF on association table pair for PTRS for CP-OFDM; Agenda Item: 6.1.2.3.4; Source: Huawei, HiSilicon, National Instruments, Intel, MediaTek; Location and Date: Prague, Czech Republic, Aug. 21-25, 2017, consisting of 5 pages.
3GPP TSG-RAN WG1 Meeting #88bis R1-170xxxx; Title: Summary of PTRS issues and way forwards; Agenda Item: 8.1.2.4.3; Source: Ericsson; Document for: Information; Location and Date: Spokane, U.S. Apr. 3-7, 2017, consisting of 4-pages.
3GPP TSG-RAN WG1 Nr-Ah 1701 R1-1700646; Title: On the need of PT-RS for DFsOFDM; Source: Mitsubishi Electric; Agenda Item: 5.1.2.3.3; Document for: Discussion/Decision; Location and Date: Spokane, Washington, Jan. 16-20, 2017, consisting of 3-pages.
3GPP TSG-RAN WG1 #87 R1-1700808; Title: Phase and frequency tracking reference signal considerations; Agenda Item: 5.1.2.3.3; Source: Qualcomm Incorporated; Document for: Discussion/Decision; Location and Date: Spokane, USA, Jan. 16-20, 2017, consisting of 7 pages.
3GPP TSG WG1 NR Ad Hoc R1-1700932; Title: Time and frequency pattern for PTRS; Agenda item: 5.1.2.3.3; Source: Samsung; Document for: Discussion and Decision; Location and Date: Spokane, Washington, USA Jan. 16-20, 2017, consisting of 5 pages.
3GPP TSG-RAN WG1 #87ah-NR R1-1701161; Title: SRS design; Title: On DL and UL phase noise tracking RS (PTRS); Source: Ericsson; Agenda Item: 5.1.2.3.3; Document for: Discussion and Decision; Location and Date: Spokane, WA, USA, Jan. 16-20, 2017, consisting of 9 pages.
3GPP TSG RAN WG1 meeting #88 R1-1702332; Title: On PTRS for DFT-s-OFDM; Agenda Item: 8.1.2.4.3; Source: InterDigital Communications; Document for: Discussion and Decision; Location and Date: Athens, Greece Feb. 13-17, 2017, consisting of 9 pages.
3GPP TSG RAN WG1 #88 R1-1702959; Title: PT-RS design; Agenda item: 8.1.2.4.3; Source: Samsung; Document for Discussion and Decision; Location and Date: Athens, Greece Feb. 13-17, 2017, consisting of 6 pages.
3GPP TSG RAN WG1 Meeting #88 R1-1703879; Title: WF on PTRS; NTT DOCOMO, Huawei, HiSilicon, Panasonic, Ericsson, Intel, CATT, Nokia, ASB, [. . . ]; Agenda item: 8.1.2.4.3; Location and Date: Athens, Greece Feb. 13-17, 2017, consisting of 2 pages.
Chinese Office Action and English Summary dated Oct. 28, 2023 for Application No. 202210935222.7, consisting of 9 pages.
3GPP TSG RAN WG1 #88bis R1-1705355; Title: DL PT-RS design; Agenda item: 8.1.2.4.3; Source: Samsung; Document for: Discussion and Decision; Location and Date: Spokane, USA Apr. 3-7, 2017, consisting of 7 pages.
3GPP TSG RAN WG1 #88bis R1-1705356; Title: Discussion on UL PT-RS; Agenda item: 8.1.2.4.3; Source: Samsung; Document for: Discussion and Decision, Location and Date: Spokane, USA Apr. 13-17, 2017, consisting of 2 pages.
3GPP TSG RAN WG1 Meeting #88bis R1-1705513; Title: On PTRS for DFT-s-OFDM; Agenda item: 8.1.2.4.3; Source: InterDigital Communications; Document for: Discussion and Decision; Location and Date: Spokane, USA Apr. 3-7, 2017, consisting of 7 pages.
3GPP TSG RAN WG1 Meeting #88bis R1-1706676; Merged WF on PTRS structure; Ericsson, Panasonic, Huawei, HiSilicon, NTT Decomo; Agenda Item: 8.1.2.4.3; Location and Date: Spokane, USA Apr. 3-7, 2017, consisting of 2 pages.
International Search Report and Written Opinion dated Sep. 25, 2018 for International Application No. PCT/SE2018/050629 filed on Jun. 15, 2018, consisting of 12 pages.

* cited by examiner

JOINT RESOURCE MAP DESIGN OF DM-RS AND PT-RS

CROSS-REFERENCE TO RELATED APPLICATIONS

This application is a continuation of U.S. application Ser. No. 18/191,618 filed Mar. 28, 2023, which itself is a continuation of U.S. application Ser. No. 16/073,680 filed Jul. 27, 2018, which is a National Stage Application of International Application No. PCT/SE2018/050629, filed Jun. 15, 2018, which claims priority to U.S. Provisional Application No. 62/521,078, filed Jun. 16, 2017, the entireties of all of which are incorporated herein by reference.

TECHNICAL FIELD

This disclosure relates to wireless communications, and in particular to a method, network node and wireless device for scheduling phase tracking reference signals, PT-RS, jointly with demodulation reference signals, DM-RS.

BACKGROUND

The physical layer of New Radio (NR) (the third generation partnership project (3GPP) fifth generation (5G) mobile radio systems) is expected to handle a vast number of different transmission scenarios by operating in the frequency range from below 1 GHz to 100 GHz. Carrier frequencies above 6 GHz are not supported by long term evolution (LTE), so NR requires a new and flexible design for the physical layer which offers good performance in a wider range of frequencies than the physical layer of LTE.

Similar to LTE, NR will use orthogonal frequency division multiplexing (OFDM) based waveforms with reference signals and physical layer channels mapped on a time-frequency resource grid. NR has an ultra-lean design that minimizes always-on transmissions to enhance network energy efficiency and ensure forward compatibility. In contrast to the setup in LTE, the reference signals in NR are transmitted only when necessary. Demodulation reference signals (DM-RS) and phase-tracking reference signals (PT-RS) are two variations of reference signals among the others.

DM-RS is used to estimate the radio channel for demodulation. DM-RS is wireless device-specific, can be beamformed, confined in a scheduled resource, and transmitted only when necessary, both in downlink (DL), i.e., from base station to wireless device, and uplink (UL), i.e., from wireless device to base station. To support multiple-layer multiple input multiple output (MIMO) transmission, multiple orthogonal DM-RS ports can be scheduled, one for each layer. Orthogonality is achieved by frequency division multiplexing (FDM) (comb structure), time division multiplexing (TDM) and code division multiplexing (CDM) (with cyclic shift of the root sequence or orthogonal cover codes). The basic DM-RS pattern is front loaded, as the DM-RS design takes into account the early decoding requirement to support low-latency applications. For low-speed scenarios, DM-RS uses low density in the time domain. However, for high-speed scenarios, the time density of DM-RS is increased to track fast changes in the radio channel. FIGS. 1 and 2 illustrate the potential DM-RS resource mapping in the frequency-time grid for low Doppler and high Doppler scenarios, respectively, in the transmission slot.

Another challenge that NR faces is the radio-frequency (RF) impairments when wireless systems operate in the millimeter (mm) wave band, specifically, the effects of phase noise produced by the local oscillators. The degradation produced by phase noise increases as the carrier frequency increases, so that the physical layer of NR operating in mmWave frequencies has to be robust to phase noise in order to achieve good performance. Hence, there is a need for a new reference signal called the phase tracking reference signal (PT-RS). Such signal can be used both for mitigation of the phase noise-induced common phase error (CPE), experienced equally on all subcarriers within an OFDM symbol, and inter-carrier interference (ICI) caused by the loss of orthogonality between subcarriers.

The PT-RS may be needed both in uplink and downlink. It is foreseen that this signal can be used for both fine carrier frequency-synchronization and phase noise compensation. This signal is assumed to be present and needed only at high carrier frequencies, while the other properties of the DM-RS can remain somewhat unchanged. An example of adding a PT-RS at high carrier frequencies is depicted in FIG. 3.

Different modulation and coding schemes (MCS) offer different robustness against the effects of phase noise, as shown in FIGS. 4 and 5. Therefore, the time density of PT-RS for a specific wireless device (WD) can be configured according to the scheduled MCS.

The problems of the existing solution can be summarized as follows:
- PT-RS is a new reference-signal introduced to NR, which may co-exist with DM-RS in certain scenarios;
- Each type of reference signal needs to reserve its own resource in the time-frequency grid;
- Prior art solutions propose a joint design for DM-RS and PT-RS but the design is limited to the case in which just one DM-RS instance is scheduled in the slot; and
- Pilot contamination may happen such that the overhead of the total resources used by reference signals needs to be controlled.

SUMMARY

The proposed solution for the joint design of DM-RS and PT-RS may be based on the conditions that the PT-RS mapping in the time domain may depend at least on the following:
- The position of the front-loaded DM-RS in the slot for an antenna port in which PT-RS is mapped;
- Required time density in the time domain for PT-RS;
- The position of the first symbol scheduled for data transmission in the transmission slot; and
- The position of the last symbol scheduled for data transmission in the transmission slot.

The proposed solution may also include joint mapping of DM-RS and PT-RS. The position of the additional DM-RS in the slot may depend on the PT-RS which is mapped.

One aspect is that the PT-RS resource can be aligned with the first DM-RS in the slot when PT-RS is scheduled. Furthermore, when the additional DM-RS and PT-RS both exist in the resource grid, the additional DM-RS position may align with the PT-RS position.

In some embodiments, a method for use in a radio node in a wireless communication system for one of transmitting and receiving a phase tracking-reference signal (PT-RS) is provided. The method includes obtaining information about a position in a time domain of a scheduled first demodulation reference signal (DM-RS) in a slot. The method also includes one of transmitting and receiving the PT-RS within the slot, where the position of the PT-RS depends on the position in the time domain of the scheduled first DM-RS.

In some embodiments, the obtaining comprises one of receiving information about and determining the position in the time domain of the scheduled first DM-RS. In some embodiments, the method further includes obtaining information about a position of a first time symbol in a slot scheduled for data transmission. In some embodiments, the method also includes obtaining information about a position of a last time symbol in the slot scheduled for data transmission. In some embodiments, the method also includes obtaining information indicating a scheduled modulation and coding scheme, MCS, and transmitting the PT-RS with a time density based on the scheduled MCS. In some embodiments, the time density is one 1, ½ and ¼. In some embodiments, the method includes mapping the PT-RS to resource elements, REs, in the slot based on one or more of a position of the scheduled first DM-RS, a scheduled MCS, a required time-density, a position of the first time symbol scheduled for data transmission and a position of the last time symbol scheduled for data transmission. In some embodiments, the first DM-RS is scheduled in resource elements, REs, which span several subcarriers in frequency and at least one time symbol of the slot in time, while the PT-RS is one of transmitted and received in REs which span at least one subcarrier in frequency and multiple time symbols of the slot in time. In some embodiments, a physical resource block, PRB, of the slot has 12 subcarriers in the frequency domain and one of 12 and 14 time symbols in the time domain. In some embodiments, the radio node is one of a WD and a network node.

According to another aspect, a radio node in a wireless communication system configured for one of transmitting and receiving a PT-RS is provided. The radio node includes processing circuitry configured to obtain information about a position in a time domain of a scheduled first DM-RS in a slot. The processing circuitry is further configured to one of transmit and receive the PT-RS within the slot, where the position of the PT-RS depends on the position in the time domain of the scheduled first DM-RS.

According to this aspect, in some embodiments, the obtaining comprises one of receiving information about and determining the position in the time domain of the scheduled first DM-RS. In some embodiments, the processing circuitry is further configured to obtain information about a position of a first time symbol in a slot scheduled for data transmission, and obtain information about a position of a last time symbol in the slot scheduled for data transmission. In some embodiments, the processing is further configured to obtain information indicating a scheduled modulation and coding scheme, MCS, and transmit the PT-RS with a time density based on the scheduled MCS. In some embodiments, the time density is one 1, ½ and ¼. In some embodiments, the processing circuitry is further configured to map the PT-RS to resource elements, REs, in the slot based on one or more of a position of the scheduled first DM-RS, a scheduled MCS, a required time-density, a position of the first time symbol scheduled for data transmission and a position of the last time symbol scheduled for data transmission. In some embodiments, the first DM-RS is scheduled in resource elements, REs, which span several subcarriers in frequency and at least one time symbol of the slot in time, while the PT-RS is one of transmitted and received in REs which span at least one subcarrier in frequency and multiple time symbols of the slot in time. In some embodiments, a physical resource block, PRB, of the slot has 12 subcarriers in the frequency domain and one of 12 and 14 time symbols in the time domain. In some embodiments, the radio node is one of a WD and a network node.

According to another aspect, a radio node in a wireless communication system configured for one of transmitting and receiving a PT-RS is provided. The radio node includes demodulation reference signal, DM-RS, position module configured to obtain information about a position in a time domain of a scheduled first DM-RS in a slot. The radio node further includes a PT-RS transceiver module configured to one of transmit and receive the PT-RS within the slot, where the position of the PT-RS depends on the position in the time domain of the scheduled first DM-RS. In some embodiments, the first DM-RS is scheduled in resource elements, REs, which span several subcarriers in frequency and at least one single time symbol of the slot in time, while the PT-RS is one of transmitted and received in REs which span at least one subcarrier in frequency and multiple time symbols of the slot in time.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
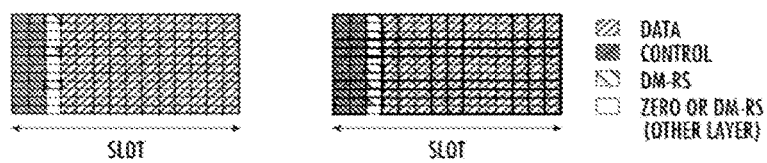
FIG. 1 shows possible DM-RS patterns for NR that support early decoding for low Doppler.
Figure 2:
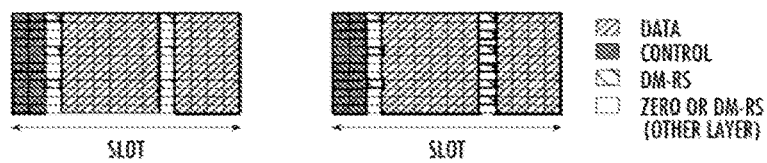
FIG. 2 shows possible DM-RS patterns for NR that support early decoding for high Doppler.
Figure 3:
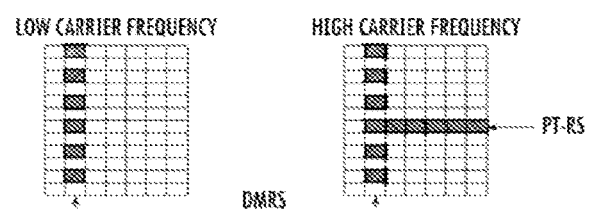
FIG. 3 shows addition of PT-RS at high carrier frequencies.
Figure 4:
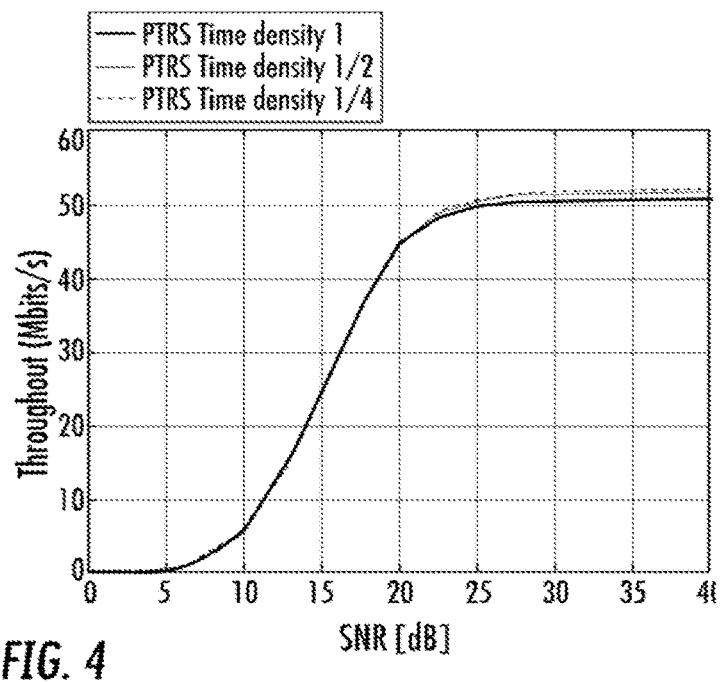
FIG. 4 shows evaluation results for 16 QAM (¾) MCS.
Figure 5:
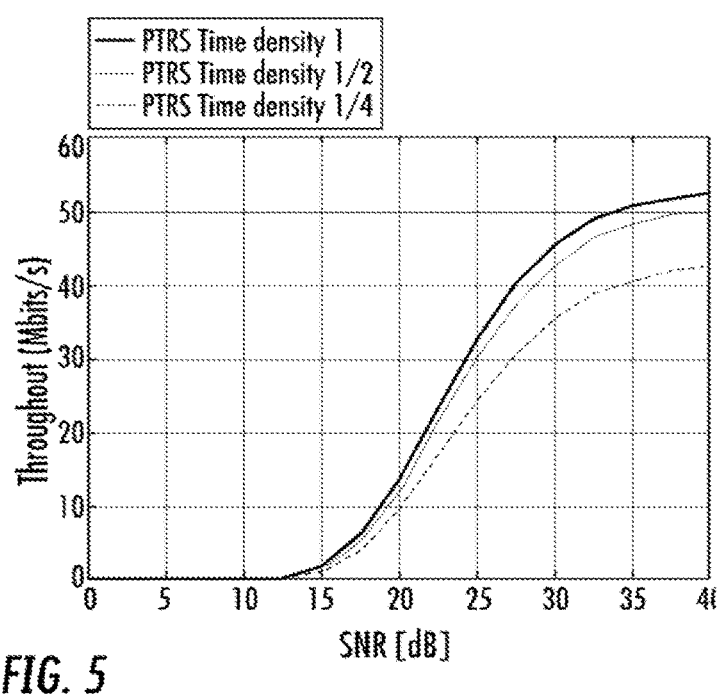
FIG. 5 shows evaluation results for 64 QAM (⅚) MCS.

Before describing in detail exemplary embodiments, it is noted that the embodiments reside primarily in combinations of apparatus components and processing steps related to scheduling phase tracking reference signals, PT-RS, jointly with demodulation reference signals, DM-RS. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

The term signal used herein can be any physical signal or physical channel. Examples of physical signals are reference signal such as PSS, SSS, CRS, PRS etc. The term physical channel (e.g., in the context of channel reception) used herein is also called as 'channel. Examples of physical channels are MIB, PBCH, NPBCH, PDCCH, PDSCH, sPUCCH, SPDSCH, sPUCCH, sPUSCH, MPDCCH, NPDCCH, NPDSCH, E-PDCCH, PUSCH, PUCCH, NPUSCH etc. These terms/abbreviations may be used according to 3GPP standard language, in particular according to LTE and/or NR.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station or eNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station, gNB or eNodeB, may be adapted to provide and/or define and/or control one or more cells, e.g., a PCell and/or a LA cell.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node 16, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal (e.g. WD) may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor. In particular, configuring a terminal (e.g. WD) may comprise configuring the WD to perform certain measurements on certain subframes or radio resources and reporting such measurements according to embodiments of the present disclosure Signaling may comprise one or more signals and/or symbols. Reference signaling may comprise one or more reference signals and/or symbols. Data signaling may pertain to signals and/or symbols containing data, in particular user data and/or payload data and/or data from a communication layer above the radio and/or physical layer/s. It may be considered that demodulation reference signaling comprises one or more demodulation signals and/or symbols. Demodulation reference signaling may in particular comprise DM-RS according to 3GPP and/or NR and/or LTE technologies. Demodulation reference signaling may generally be considered to represent signaling providing reference for a receiving device like a terminal to decode and/or demodulate associated data signaling or data. Demodulation reference signaling may be associated to data or data signaling, in particular to specific data or data signaling. It may be considered that data signaling and demodulation reference signaling are interlaced and/or multiplexed, e.g. arranged in the same time interval covering e.g. a subframe or slot or symbol, and/or in the same time-frequency resource structure like a resource block. A resource element may represent a smallest time-frequency resource, e.g. representing the time and frequency range covered by one symbol or a number of bits represented in a common modulation. A resource element may e.g. cover a symbol time length and a subcarrier, in particular in 3GPP and/or NR and/or LTE standards. A data transmission may represent and/or pertain to transmission of specific data, e.g. a specific block of data and/or transport block. Generally, demodulation reference signaling may comprise and/or represent a sequence of signals and/or symbols, which may identify and/or define the demodulation reference signaling.

Data or information may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

Figure 6:
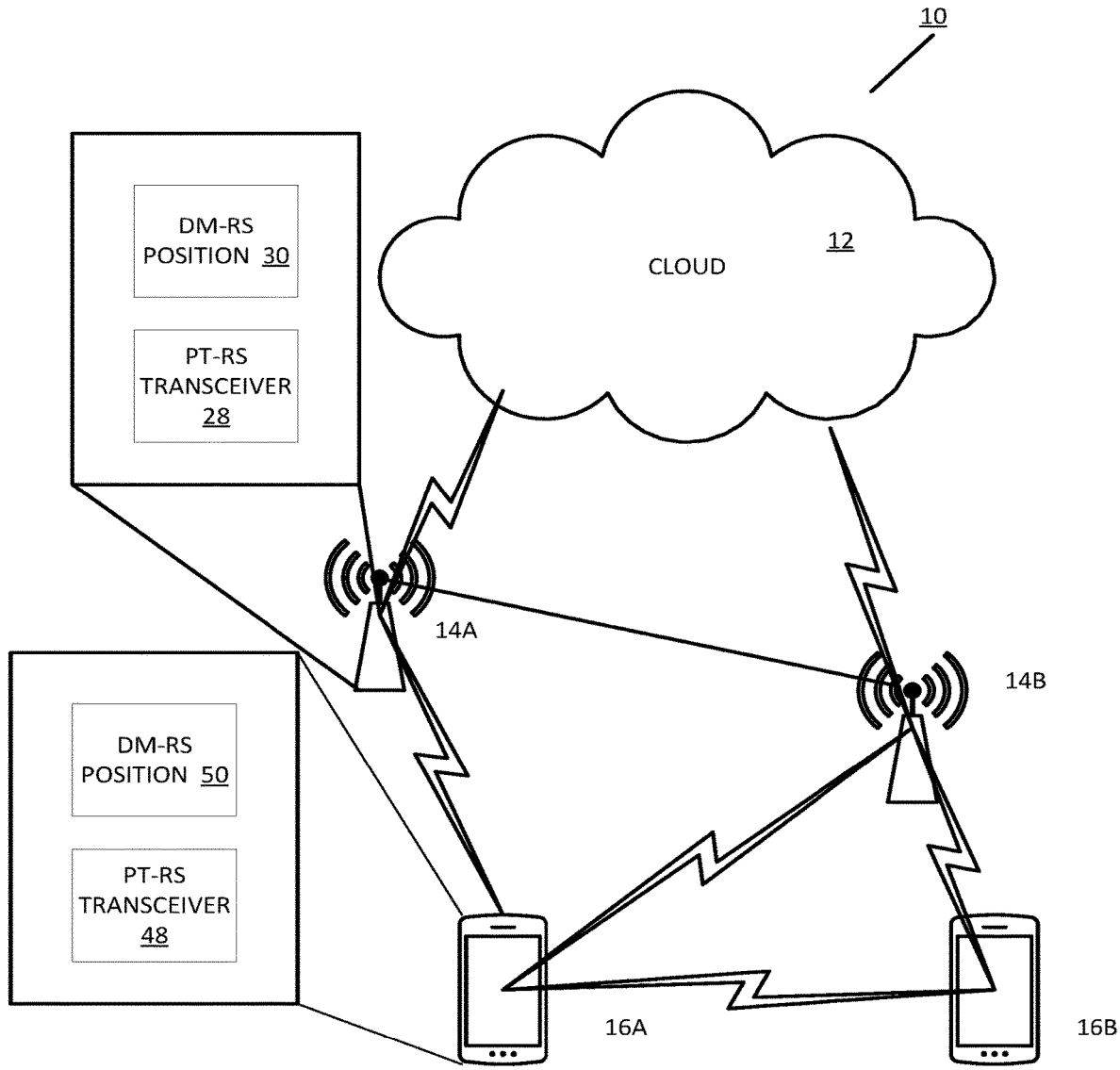
FIG. 6 is a block diagram of a wireless communication system constructed in accordance with principles set forth herein.

FIG. 6 is a block diagram of a wireless communication network configured according to principles set forth herein. The wireless communication network 10 includes a cloud 12 which may include the Internet and/or the public switched telephone network (PSTN). Cloud 12 may also serve as a backhaul network of the wireless communication network 10. The wireless communication network 10 includes one or more network nodes 14A and 14B, which may communicate directly via an X2 interface in LTE embodiments, and are referred to collectively as network nodes 14. It is contemplated that other interface types can be used for communication between network nodes 14 for other communication protocols such as New Radio (NR). The network nodes 14 may serve wireless devices 16A and 16B, referred to collectively herein as wireless devices 16. Note that, although only two wireless devices 16 and two network nodes 14 are shown for convenience, the wireless communication network 10 may typically include many more wireless devices (WDs) 16 and network nodes 14. Further, in some embodiments, WDs 16 may communicate directly using what is sometimes referred to as a side link connection.

The term "wireless device" or mobile terminal used herein may refer to any type of wireless device communicating with a network node 14 and/or with another wireless device 16 in a cellular or mobile communication system 10. Examples of a wireless device 16 are user equipment (UE), target device, device to device (D2D) wireless device, machine type wireless device or wireless device capable of machine to machine (M2M) communication, PDA, tablet, smart phone, laptop embedded equipped (LEE), laptop mounted equipment (LME), USB dongle, etc.

The term "network node" used herein may refer to any kind of radio base station in a radio network which may further comprise any base transceiver station (BTS), base station controller (BSC), radio network controller (RNC), evolved Node B (eNB or eNodeB), NR gNodeB, NR gNB, Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc.

Although embodiments are described herein with reference to certain functions being performed by network node 14, it is understood that the functions can be performed in other network nodes and elements. It is also understood that the functions of the network node 14 can be distributed across network cloud 12 so that other nodes can perform one or more functions or even parts of functions described herein. Also, functions described herein as being performed by a network node 14 may also be performed by a wireless device 16.

The network node 14 has DM-RS position information 30 that may be stored in memory. The DM-RS position information includes information about a position in the time domain of a scheduled first DM-RS in a slot. The network node 14 also has a PT-RS transceiver 28 configured to transmit or receive a PT-RS within the slot, where the position of the PT-RS depends on a position of the DM-RS. Similarly, the wireless device 16 may include DM-RS position information 50 and a PT-RS transceiver 48 that perform the same functions as the DM-RS position memory 30 and the PT-RS transceiver 28, respectively.

Figure 7:
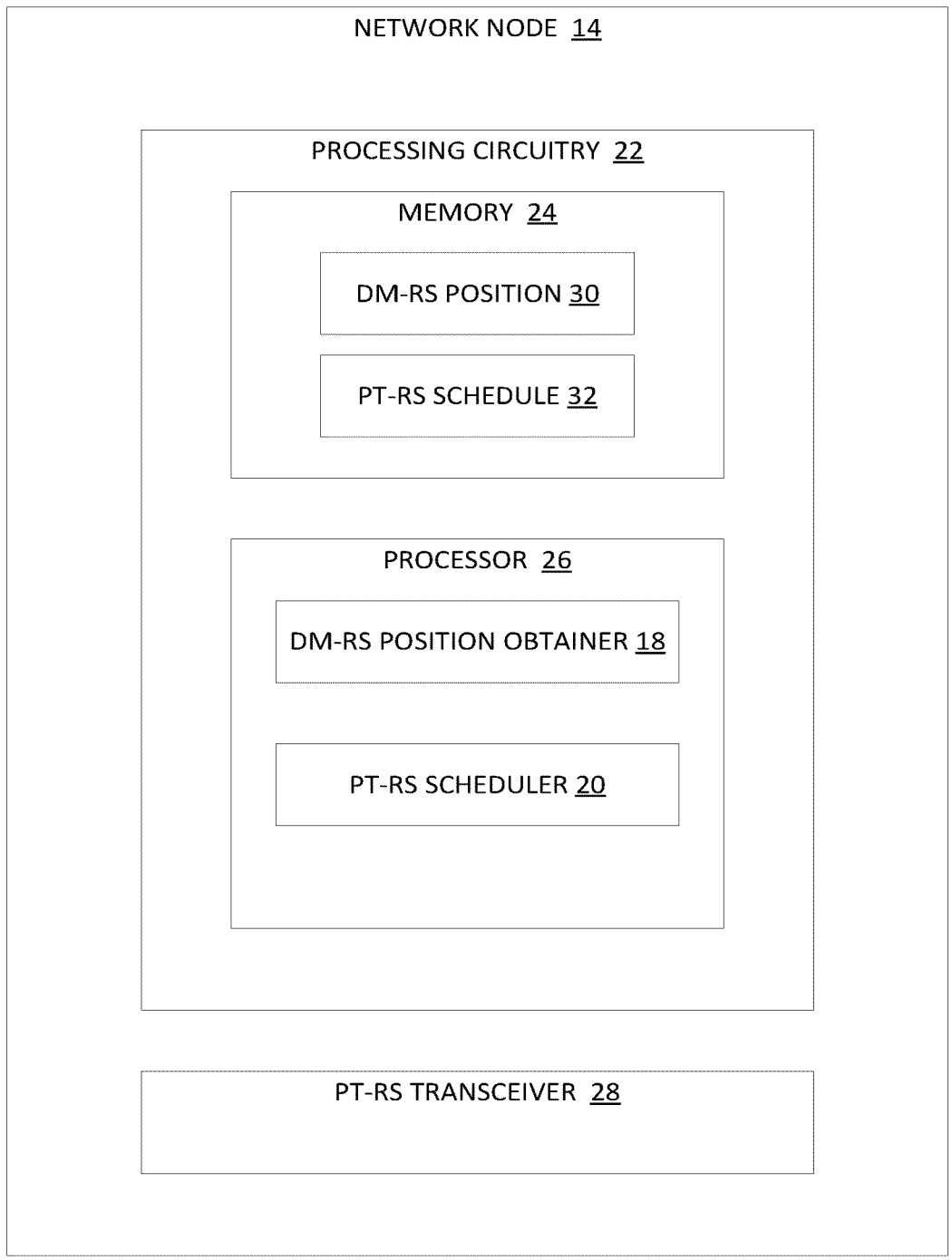
FIG. 7 is a block diagram of a network node constructed in accordance with principles set forth herein.

FIG. 7 is a block diagram of a network node 14 configured for joint scheduling of DM-RS and PT-RS. The network node 14 has processing circuitry 22. In some embodiments, the processing circuitry may include a memory 24 and processor 26, the memory 24 containing instructions which, when executed by the processor 26, configure processor 26 to perform the one or more functions described herein. In addition to a traditional processor and memory, processing circuitry 22 may include integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may include a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store DM-RS position information 30 and PT-RS schedule information 32. The processor 26 implements a DM-RS position obtainer 18 configured to obtain information about a position in the time domain of a scheduled first DM-RS in a slot. The processor 26 may also implement a PT-RS scheduler 20 configured to schedule the PT-RS in the slot. A transceiver 28 is configured to transmit the PT-RS to a wireless device 16 or receive the PT-RS from the wireless device 16, where the position of the PT-RS depends on the position of the first DM-RS.

Figure 8:
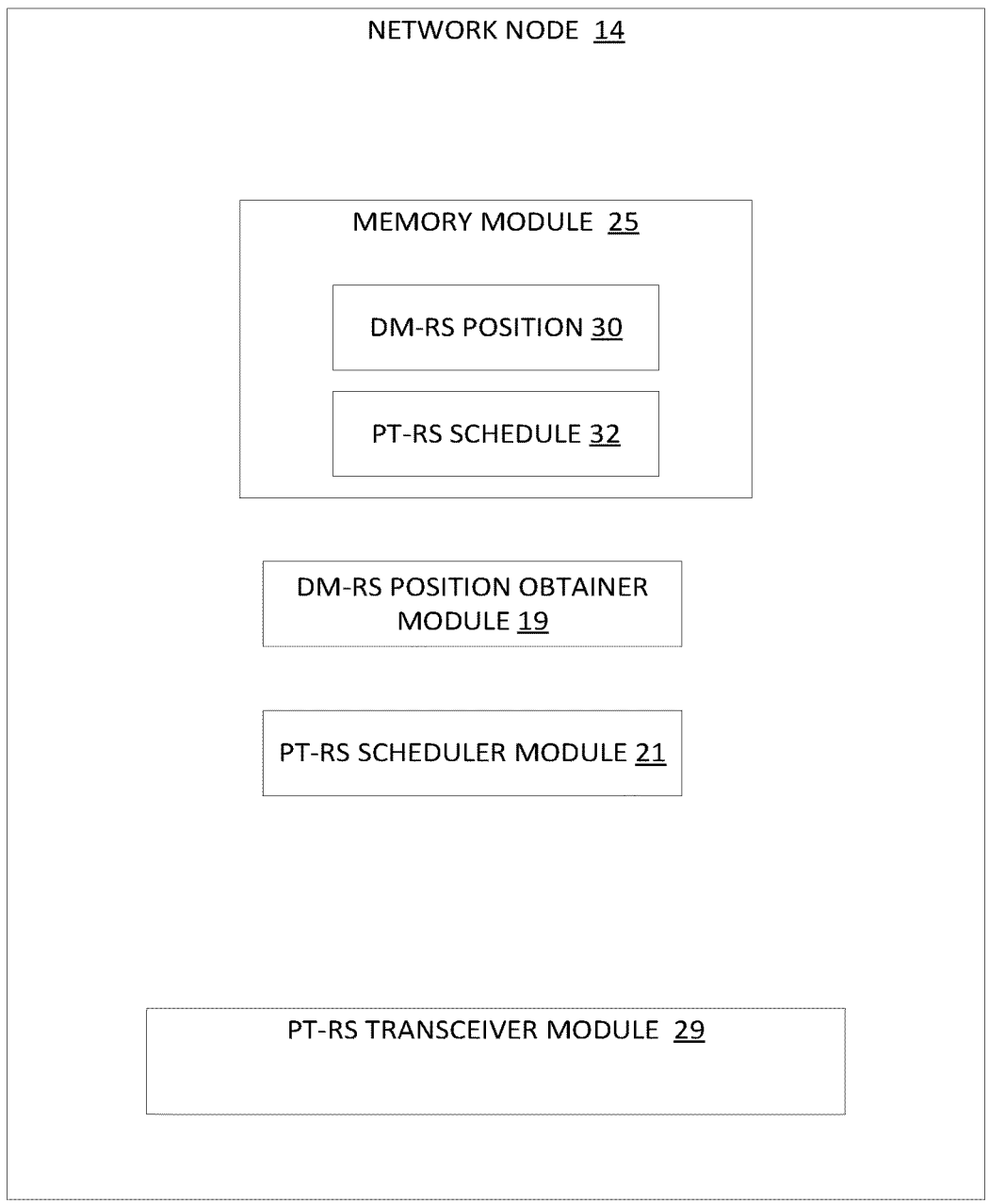
FIG. 8 is a block diagram of an alternative embodiment of a network node constructed in accordance with principles set forth herein.

FIG. 8 is a block diagram of an alternative embodiment of a network node 14 configured for joint scheduling of DM-RS and PT-RS. The memory module 25 is configured to store DM-RS position information 30 and PT-RS schedule information 32. The DM-RS position obtainer module 19 is configured to obtain information about a position in the time domain of a scheduled first DM-RS in a slot. The PT-RS scheduler module 21 is configured to schedule the PT-RS in the slot. A transceiver module 29 is configured to transmit the PT-RS to a wireless device 16 or receive a PT-RS from the wireless device 16, where the position of the PT-RS depends on the position of the first DM-RS.

Note that the same components shown in FIG. 7 in the network node 14 can be implemented in a wireless device 16 for joint scheduling of DM-RS and PT-RS by the wireless device 16 for transmission on the uplink. Thus, the wireless device 16 may have a DM-RS position obtainer 58 and a PT-RS scheduler 60 for joint scheduling of the DM-RS and PT-RS on the uplink.

Figure 9:
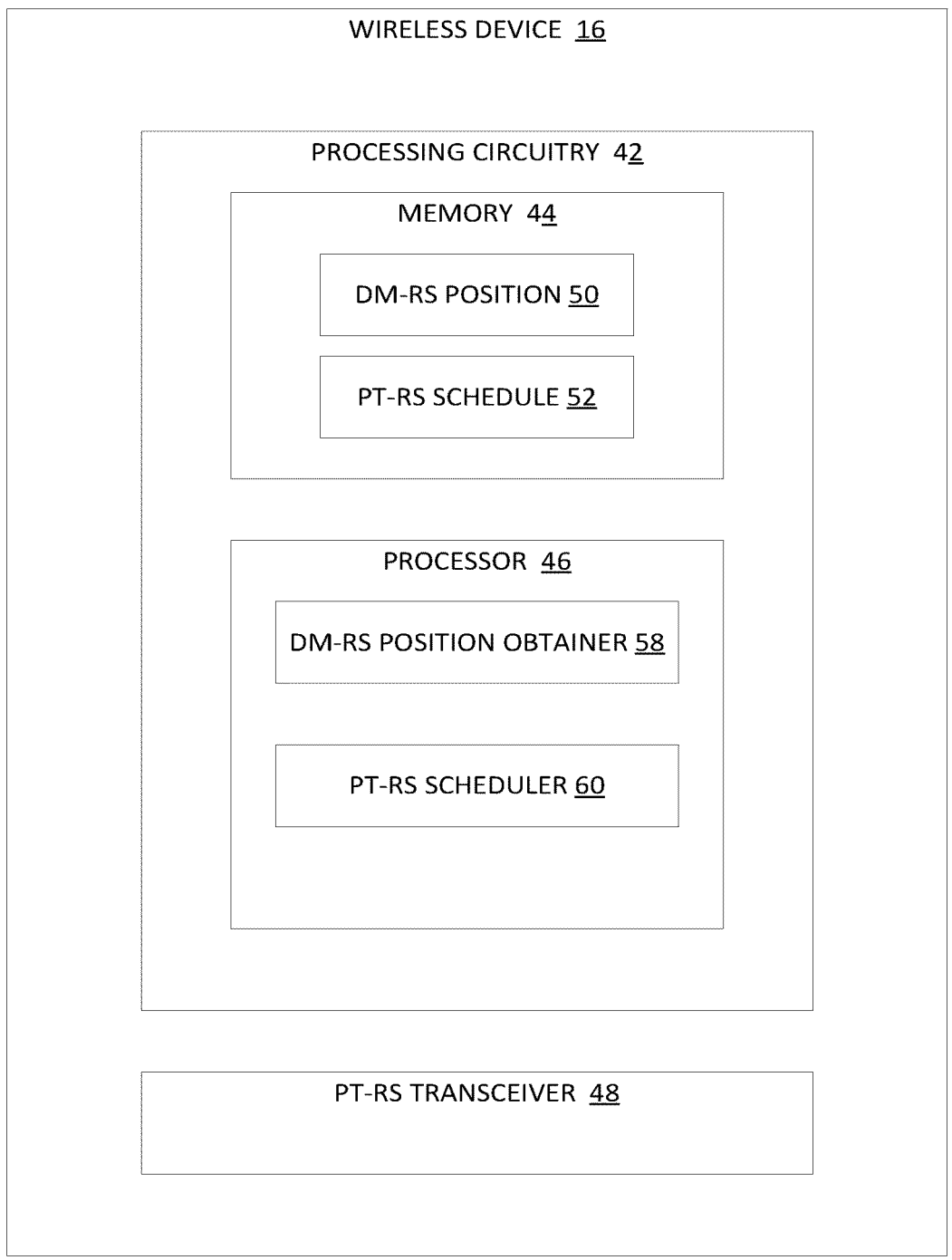
FIG. 9 is a block diagram of a wireless device constructed in accordance with principles set forth herein.

Accordingly, FIG. 9 is a block diagram of a wireless device 16 configured for joint scheduling of DM-RS and PT-RS. The wireless device 16 has processing circuitry 42. In some embodiments, the processing circuitry may include a memory 44 and processor 46, the memory 44 containing instructions which, when executed by the processor 46, configure processor 46 to perform the one or more functions described herein. In addition to a traditional processor and memory, processing circuitry 42 may include integrated circuitry for processing and/or control, e.g., one or more processors and/or processor cores and/or FPGAs (Field Programmable Gate Array) and/or ASICs (Application Specific Integrated Circuitry).

Processing circuitry 42 may include and/or be connected to and/or be configured for accessing (e.g., writing to and/or reading from) memory 44, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may include a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 44 is configured to store DM-RS position information 50 and PT-RS schedule information 52. The processor 46 implements a DM-RS position obtainer 58 configured to obtain information about a position in the time domain of a scheduled first DM-RS in a slot. The processor 46 also implements a PT-RS scheduler 60 configured to schedule the PT-RS in the slot. A transceiver 48 is configured to transmit the PT-RS to a network node 14 or receive a PT-RS from the network node 14, where the position of the PT-RS depends on the position in the time domain of the scheduled first DM-RS.

Figure 10:
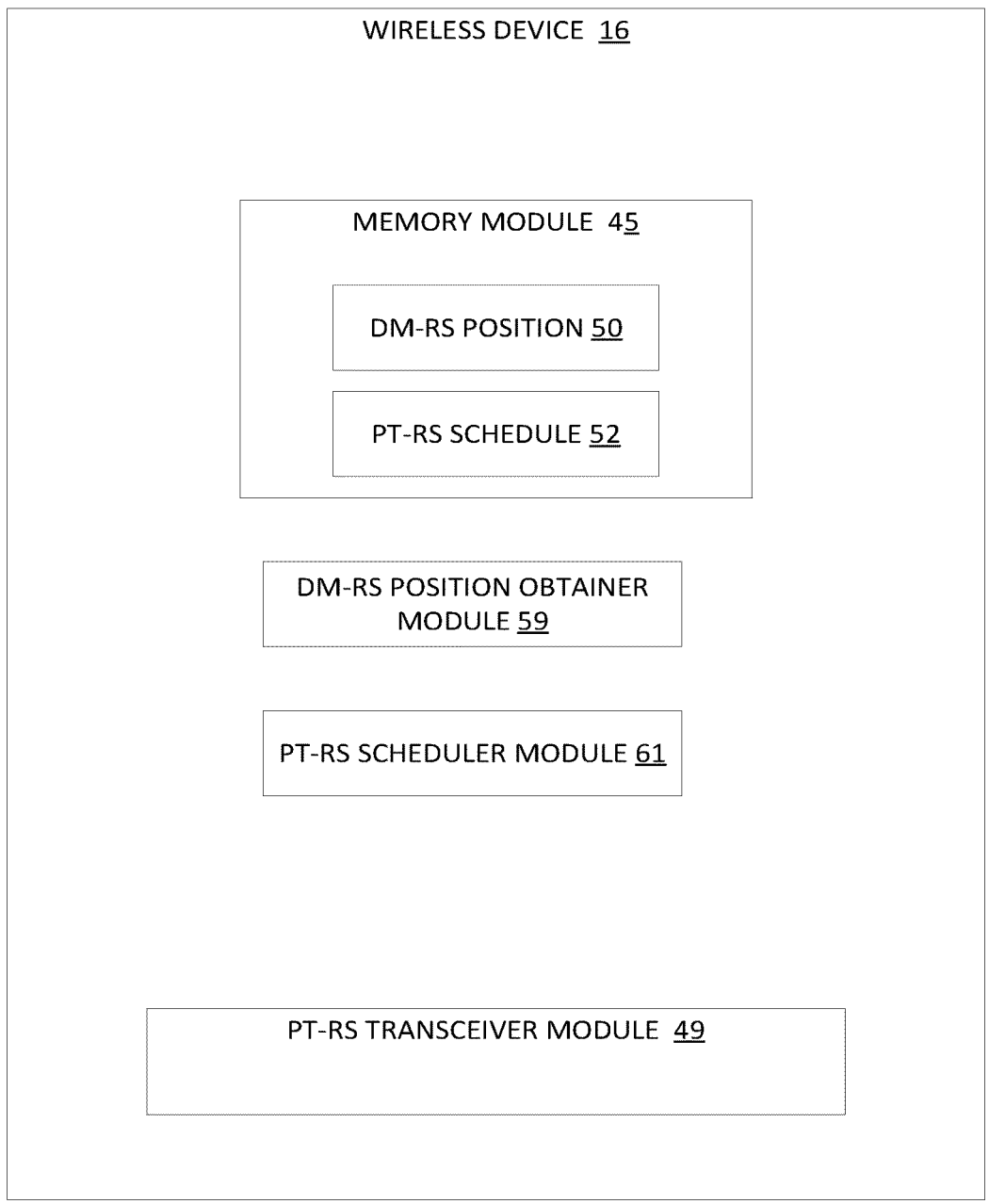
FIG. 10 is a block diagram of an alternative embodiment of a wireless device constructed in accordance with principles set forth herein.

FIG. 10 is a block diagram of an alternative embodiment of a wireless device 16 configured for joint scheduling of DM-RS and PT-RS. The memory module 45 is configured to store DM-RS position information 50 and PT-RS schedule information 52. The DM-RS position obtainer module 59 is configured to obtain information about a position in the time domain of a scheduled first DM-RS in a slot. The PT-RS scheduler module 61 is configured to schedule the PT-RS in the slot. A transceiver module 49 is configured to transmit the PT-RS to a network node 14 or receive a PT-RS from the network node 14, where the position of the PT-RS depends on the position in the time domain of the scheduled first DM-RS.

Figure 11:
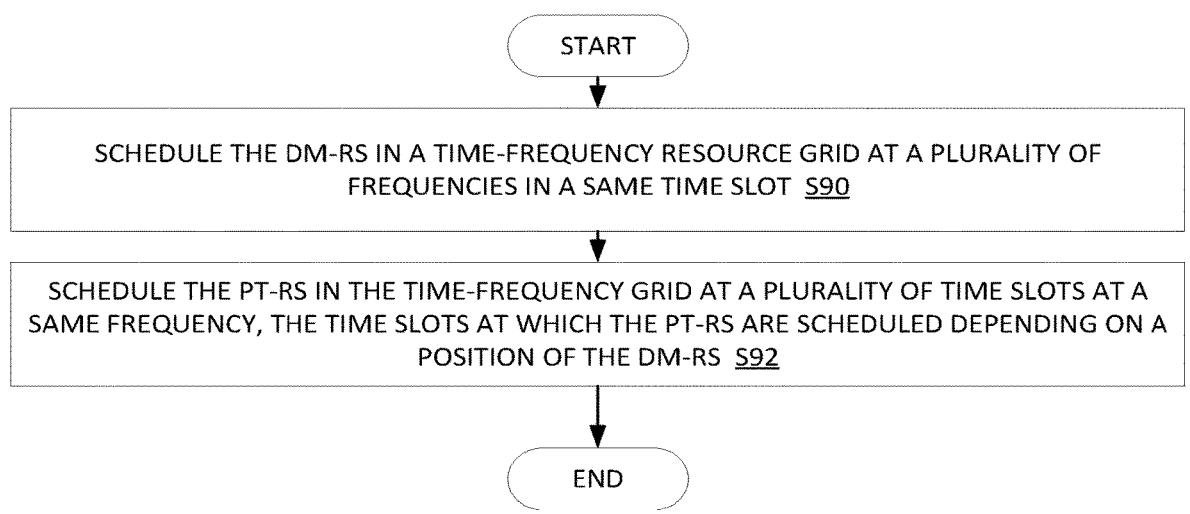
FIG. 11 is a flowchart of an exemplary process for joint scheduling of DM-RS and PT-RS that can be performed in the wireless device and/or the network node.

FIG. 11 is a flowchart of an exemplary process for joint scheduling of DM-RS and PTRS. This process can be performed in the network node 14 and/or in the wireless device 16. The process includes scheduling, via the processor 26, 46, the DM-RS in a time-frequency resource grid at a plurality of frequencies in a same time slot (block S90). The process also includes scheduling, via the PT-RS scheduler 20, 60, the PT-RS in the time-frequency grid at a plurality of time slots at a same frequency, the time slots at which the PT-RS are scheduled depending on a position of the DM-RS (block S92).

Figure 12:
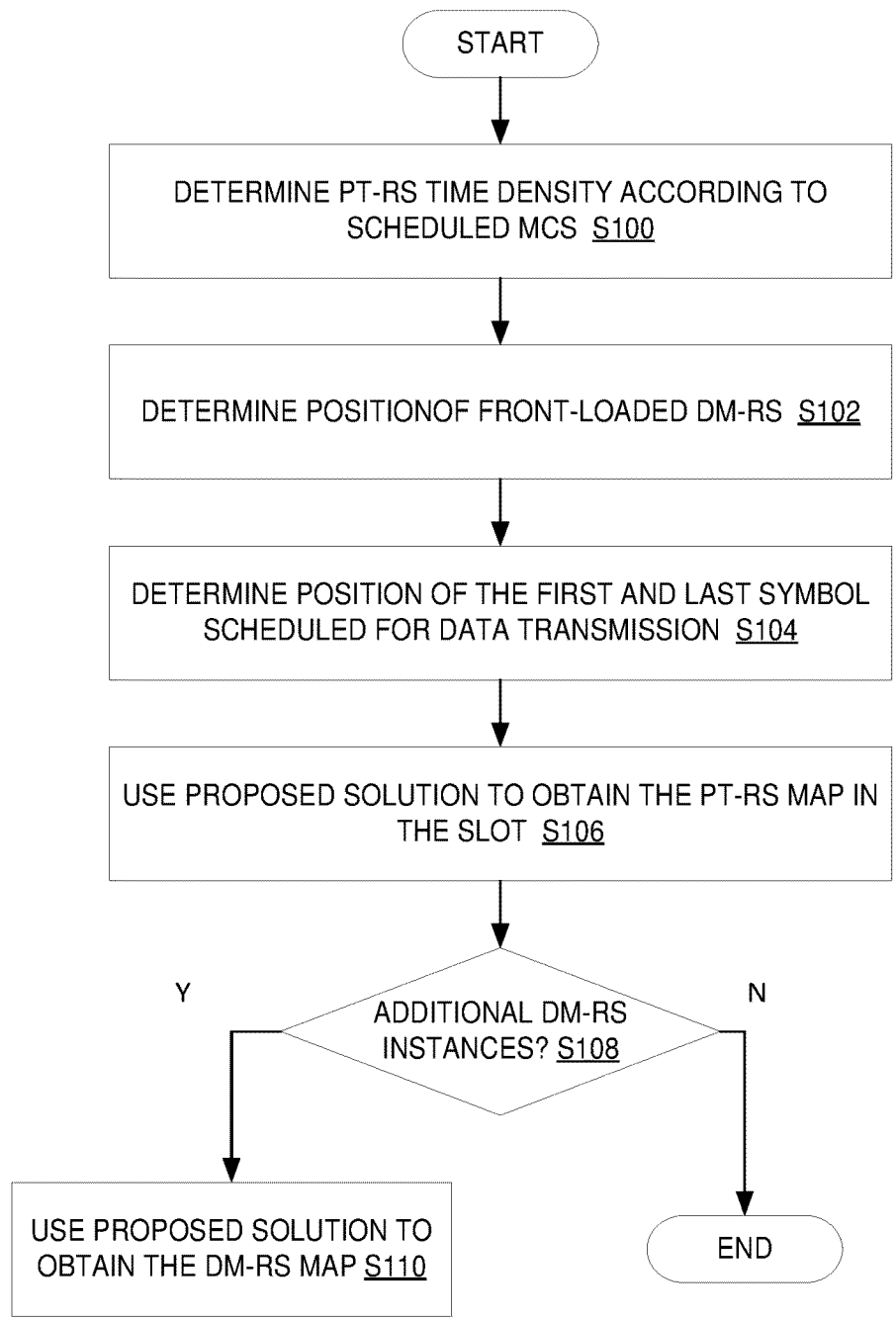
FIG. 12 is a flowchart of an exemplary process for scheduling DM-RS and PT-RS.

An advantage of some embodiments is that the total reference signal overhead can be reduced to avoid pilot contamination, while achieving the required estimation quality. The main steps of an embodiment of the proposed joint design of DM-RS and PT-RS position are shown in FIG. 12. The process includes determining, via the PT-RS scheduler 20, 60 a PT-RS time density according to a scheduled MCS (block S100). The process also includes determining, via the DM-RS position obtainer, 18, 58, a position of a front loaded DM-RS (block S102). The process further includes determining, via the processor 26, 46, a position of the first and last symbol scheduled for data transmission (block S104). Then the solution proposed and described herein is used to obtain a map of the PT-RS in a slot (block S106). If there are additional instances of the DM-RS (block S108), then the proposed solution is used to obtain the DM-RS map (block S110). Otherwise, the process concludes.

Figure 13:
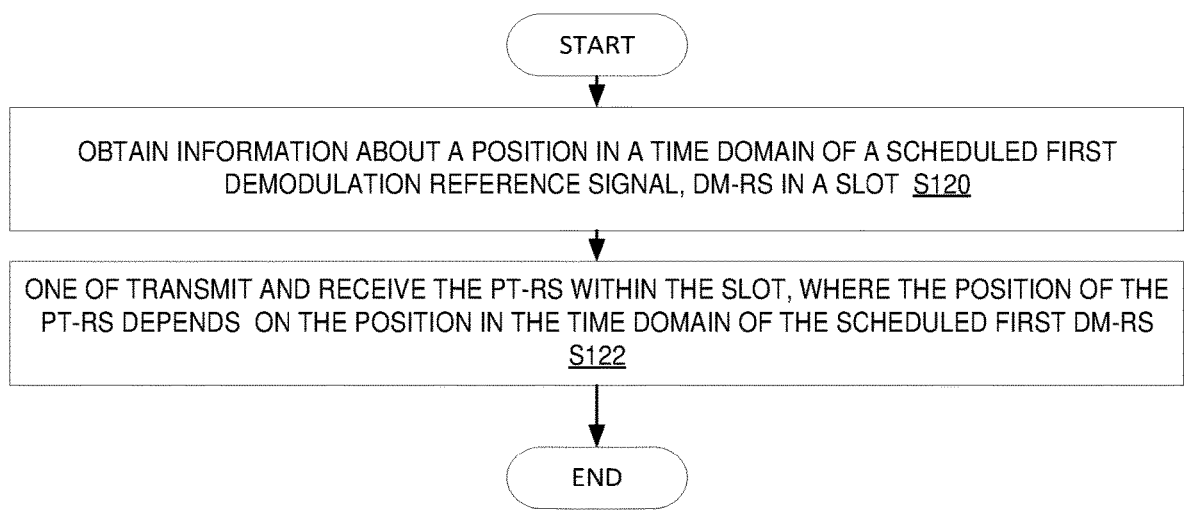
FIG. 13 is a flowchart of an exemplary process for transmitting and receiving a phase tracking reference signal (PT-RS)

FIG. 13 is a flowchart of an exemplary process for transmitting or receiving a phase tracking reference signal (PT-RS). The process includes obtaining, via the DM-RS position obtainer 18, 48, information about a position in a time domain of a scheduled first demodulation reference signal, DM-RS in a slot (block S120). The position may be obtained from the WD 16 via radio resource control scheduling of the DM-RS. The process also includes one of transmitting and receiving, via the PT-RS transceiver 28, 48, the PT-RS within the slot, where the position of the PT-RS depends on the position in the time domain of the scheduled first DM-RS (block S122).

Having described the general process flow of arrangements of the disclosure and having provided examples of hardware and software arrangements for implementing the processes and functions of the disclosure, the sections below provide details and examples of arrangements for implementing embodiments of the disclosure and for transmitting and receiving PT-RS.

The proposed solution may have at least some of the following benefits:
  a reduction in the total overhead of the reference signals when DM-RS and PT-RS are both scheduled;
  a common design of both reference signals which adapts with the actual position of the front-loaded DM-RS in the slot; and
  both types of reference signal can provide desired estimation quality.

The process may be described as follows, in some embodiments. Consider a slot-based transmission. A slot-interval may be L OFDM symbol length, e.g., 7 or 14 symbols. The symbol index has range [1:L]. The mapping of the PT-RS in the time domain is determined by:
  $X_{REF} = \min(D_{FL})$, where $D_{FL}$ represents the set containing the position of the front-loaded DM-RS.
  $\Delta_{PTRS}$, the distance between PT-RS instances, which is inversely proportional to the PT-RS time density.
  $D_0 \geq 1$, the first symbol scheduled for data transmission in the slot.
  $D_1 \leq L$, the last symbol scheduled for data transmission in the slot.
Let P represent the set containing the time position of PT-RS in the transmission slot. In order to obtain an aligned design for front-loaded DM-RS and PT-RS, P may be defined as follows:

$P = \{n \in \mathbb{N} / D_0 \leq n \leq D_1 \text{ and } (n - X_{REF}) \bmod \Delta_{PTRS} = 0\}$ Let D represent the set of potential positions of the additional DM-RS in the slot. In order to obtain an aligned design for DM-RS and PT-RS, D may be defined as follows:

$$D = \{n \in P \text{ and } n > X_{REF}\}$$

So the DM-RS instances are a subset of the PT-RS instances, offering an aligned design for PT RS and DM-RS. To summarize, the overall criteria of a proposed solution according to some embodiments may be expressed as:

$$P, D = \text{argmax}|P \cap D|$$

subject to $X_{REF}, \Delta_{PTRS}, D_0, D_1$.

Embodiment: Front Loaded DM-RS and PT-RS with Time Density 1

Figure 14:
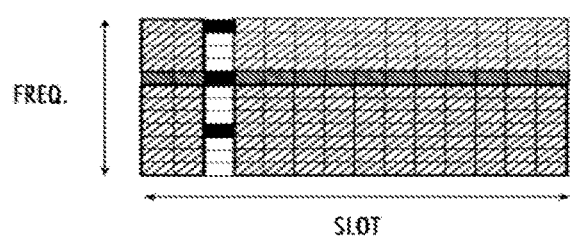
FIG. 14 shows a single DM-RS instance with aligned DM-RS and PT-RS with time density 1.

In FIG. 14, an example of joint design for PT-RS with time density 1 and single front-loaded DMRS instance pattern is shown.

Figure 15:
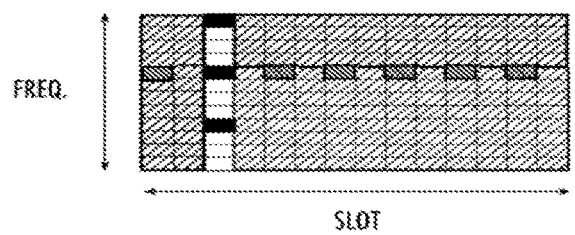
FIG. 15 shows a single front loaded DM-RS with aligned DM-RS and PT-RS with time density ½.

In FIG. 15, an example of joint design for single front-loaded DM-RS pattern and PT-RS with time density ½ is shown. It can be seen that by using a joint design for DM-RS and PT-RS, the reference signal overhead in the slot may be kept low (because the DM-RS instance can be re-used for phase noise estimation, replacing PT-RS). Without the joint design the reference signal time density could be higher than ½.

Figure 16:
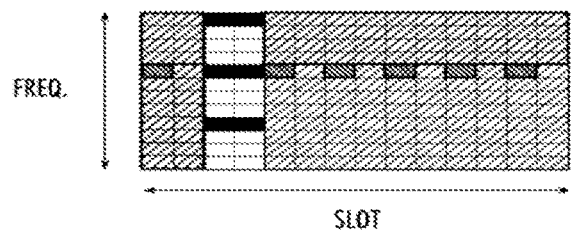
FIG. 16 shows a double front loaded DM-RS with aligned DM-RS and PT-RS with time density ½.

FIG. 16 is an example of a joint design for a double front-loaded DMRS pattern and PT-RS with time density ½. A benefit of the proposed joint design in some embodiments is that the PT-RS map does not change for single and front-loaded DMRS pattern.

Embodiment: Front-Loaded DM-RS with Additional DM-RS Instance and PT-RS with Time Density 1

Figure 17:
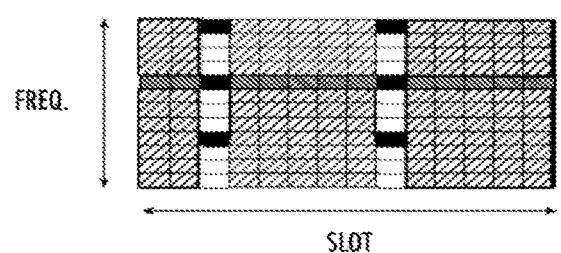
FIG. 17 shows front loaded DM-RS pattern with additional DM-RS and PT-RS with time density 1.

In FIG. 17, an example of a joint design for front loaded DM-RS pattern with additional DM-RS and PT-RS with time density 1 is shown.

Embodiment: Front-Loaded DM-RS with Additional DM-RS Instance and PT-RS with Time Density ½

Figure 18:
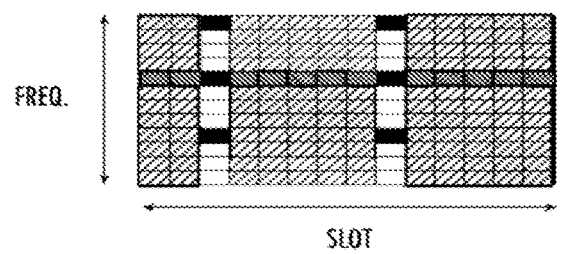
FIG. 18 shows front loaded DM-RS pattern with additional DM-RS and PT-RS with time density ½.

In FIG. 18, an example of a joint design for a front-loaded DMRS pattern with an additional DM-RS instance and PT-RS with time density ½ is shown. By using a joint design for DM-RS and PT-RS, the reference signal overhead in the time domain in the slot may be kept low (because the DM-RS instances can be re-used for phase noise estimation, replacing PT-RS). Without the joint design the reference signal time density could be higher than ½.

An advantage of some embodiments is that a joint design of DM-RS and PT-RS can reduce the overhead of the reference signals in the time domain while keeping accuracy in the estimations based on the reference signals.

The PT-RS is usually scheduled for only one antenna port (associated with one DMRS port), i.e., there is no multi-plexing of resources used by the PT-RS, which paves the way for the alignment of DM-RS and PT-RS resource elements to reduce overhead. The density of the PT-RS depends on the modulation and coding scheme (MCS), which provides the freedom of placing the PT-RS in the resource grid using different time-offsets with equal performance. Because the PT-RS is a time domain signal which spans the resource grid with a certain density, it also provides a set of positions with which the DM-RS can align. A result is that when the additional DMRS are scheduled, there exists at least one PT-RS resource position that provides a desired channel estimation quality.

In some embodiments, a method for use in a radio node 14, 16 in a wireless communication system for one of transmitting and receiving a phase tracking-reference signal, PT-RS, is provided. The method includes obtaining (block S120) information about a position in a time domain of a scheduled first demodulation reference signal, DM-RS in a slot. The position information may be obtained, for example from the wireless device 16 via radio resource control scheduling of the DM-RS. The method also includes one of transmitting and receiving (block S122) the PT-RS within the slot, where the position of the PT-RS depends on the position in the time domain of the scheduled first DM-RS.

In some embodiments, the obtaining comprises one of receiving information about and determining the position in the time domain of the scheduled first DM-RS. In some embodiments, the method further includes obtaining information about a position of a first time symbol in a slot scheduled for data transmission. In some embodiments, the method also includes obtaining information about a position of a last time symbol in the slot scheduled for data transmission. In some embodiments, the method also includes obtaining information indicating a scheduled modulation and coding scheme, MCS, and transmitting the PT-RS with a time density based on the scheduled MCS. This may be the case for OFDM, whereas for DFTS-OFDM waveforms, higher layer messaging may be used to indicate the time density. In some embodiments, the time density is one 1, ½ and ¼. In some embodiments, the method includes mapping the PT-RS to resource elements, REs, in the slot based on one or more of a position of the scheduled first DM-RS, a scheduled MCS, a required time-density, a position of the first time symbol scheduled for data transmission and a position of the last time symbol scheduled for data transmission. In some embodiments, the first DM-RS is scheduled in resource elements, REs, which span several subcarriers in frequency and one or two time symbols of the slot in time, while the PT-RS is one of transmitted and received in REs which span at least one subcarrier in frequency and multiple time symbols of the slot in time. In some embodiments, a physical resource block, PRB, of the slot has 12 subcarriers in the frequency domain and one of 12 and 14 time symbols in the time domain. In some embodiments, the radio node 14, 16 is one of a WD and a network node. In some embodiments, an additional DM-RS is scheduled in the same slot as the first DM-RS and PT-RS, and the position of the second DM-RS depends on the position of the PT-RS. In some embodiments, the PT-RS is only transmitted in the mm wavelength high frequency band.

According to another aspect, a radio node 14, 16 in a wireless communication system configured for one of transmitting and receiving a phase tracking-reference signal, PT-RS, is provided. The radio node 14, 16 includes processing circuitry configured to obtain information about a position in a time domain of a scheduled first demodulation reference signal, DM-RS in a slot. The processing circuitry 22, 42 is further configured to one of transmit and receive the PT-RS within the slot, where the position of the PT-RS depends on the position in the time domain of the scheduled first DM-RS.

According to this aspect, in some embodiments, the obtaining comprises one of receiving and determining information about the position in the time domain of the scheduled first DM-RS. In some embodiments, the processing circuitry 22, 42 is further configured to obtain information about a position of a first time symbol in a slot scheduled for data transmission, and obtain information about a position of a last time symbol in the slot scheduled for data transmission. In some embodiments, the processing circuitry 22, 42 is further configured to obtain information indicating a scheduled modulation and coding scheme, MCS, and transmit the PT-RS with a time density based on the scheduled MCS. In some embodiments, the time density is one 1, ½ and ¼. In some embodiments, the processing circuitry 22, 42 is further configured to map the PT-RS to resource elements, REs, in the slot based on one or more of a position of the scheduled first DM-RS, a scheduled MCS, a required time-density, a position of the first time symbol scheduled for data transmission and a position of the last time symbol scheduled for data transmission. In some embodiments, the first DM-RS is scheduled in resource elements, REs, which span several subcarriers in frequency and at least one time symbol of the slot in time, while the PT-RS is one of transmitted and received in REs which span at least one subcarrier in frequency and multiple time symbols of the slot in time. In some embodiments, a physical resource block, PRB, of the slot has 12 subcarriers in the frequency domain and one of 12 and 14 time symbols in the time domain. In some embodiments, the radio node 14, 16 is one of a WD and a network node.

According to another aspect, a radio node 14, 16 in a wireless communication system configured for one of transmitting and receiving a phase tracking-reference signal, PT-RS is provided. The radio node 14, 16 includes demodulation reference signal, DM-RS, position obtainer module 19, 59 configured to obtain information about a position in a time domain of a scheduled first demodulation reference signal, DM-RS in a slot. The radio node 14, 16 further includes a PT-RS transceiver module 29, 49 configured to one of transmit and receive the PT-RS within the slot, where the position of the PT-RS depends on the position in the time domain of the scheduled first DM-RS. In some embodiments, the first DM-RS is scheduled in resource elements, REs, which span several subcarriers in frequency and at least one time symbol of the slot in time, while the PT-RS is one of transmitted and received in REs which span at least one subcarrier in frequency and multiple time symbols of the slot in time.

Some embodiments include the following:

Embodiment 1. A method for scheduling phase tracking reference signals, PT-RS, jointly with demodulation reference signals, DM-RS, the method comprising:
scheduling the DM-RS in a time-frequency resource grid at a plurality of frequencies in a same time slot; and
scheduling the PT-RS in the time-frequency grid at a plurality of time slots at a same frequency, the time slots at which the PT-RS are scheduled depending on a position of the DM-RS.

Embodiment 2. The method of Embodiment 1, wherein a time-density of the PT-RS depends on a selected modulation and coding scheme.

Embodiment 3. The method of any of Embodiments 1 and 2, wherein the time-density is one half.

Embodiment 4. The method of any of Embodiments 1-3, wherein the DM-RS is single front loaded.

Embodiment 5. The method of any of Embodiments 1-3, wherein the DM-RS is double front loaded.

Embodiment 6. The method of any of Embodiments 1-5, wherein the method is performed by a network node.

Embodiment 7. The method of any of Embodiments 1-5, wherein the method is performed by a wireless device.

Embodiment 8. A network node configured to schedule phase tracking reference signals, PT-RS, jointly with demodulation reference signals, DM-RS, the network node comprising:
processing circuitry configured to:
schedule the DM-RS in a time-frequency resource grid at a plurality of frequencies in a same time slot; and
schedule the PT-RS in the time-frequency grid at a plurality of time slots at a same frequency, the time slots at which the PT-RS are scheduled depending on a position of the DM-RS.

Embodiment 9. The network node of Embodiments 8, wherein a time-density of the PT-RS depends on a selected modulation and coding scheme.

Embodiment 10. The network node of any of Embodiments 8 and 9, wherein the time-density is one half.

Embodiment 11. The network node of any of Embodiments 8-10, wherein the DM-RS is single front loaded.

Embodiment 12. The network node of any of Embodiments 8-10, wherein the DM-RS is double front loaded.

Embodiment 13. A network node configured to schedule phase tracking reference signals, PT-RS, jointly with demodulation reference signals, DM-RS, the network node comprising:
a DM-RS scheduling module configured to schedule the DM-RS in a time-frequency resource grid at a plurality of frequencies in a same time slot; and
a PT-RS scheduling module configured to schedule the PT-RS in the time-frequency grid at a plurality of time slots at a same frequency, the time slots at which the PT-RS are scheduled depending on a position of the DM-RS.

Embodiment 14. A wireless device configured to schedule phase tracking reference signals, PT-RS, jointly with demodulation reference signals, DM-RS, the wireless device comprising:
processing circuitry configured to:
schedule the DM-RS in a time-frequency resource grid at a plurality of frequencies in a same time slot; and
schedule the PT-RS in the time-frequency grid at a plurality of time slots at a same frequency, the time slots at which the PT-RS are scheduled depending on a position of the DM-RS.

Embodiment 15. The network node of claim 14, wherein a time-density of the PT-RS depends on a selected modulation and coding scheme.

Embodiment 16. The network node of any of Embodiments 14 and 15, wherein the time-density is one half.

Embodiment 17. The network node of any of Embodiments 14-16, wherein the DM-RS is single front loaded.

Embodiment 18. The network node of any of Embodiments 14-16, wherein the DM-RS is double front loaded.

Embodiment 19. A wireless device configured to schedule phase tracking reference signals, PT-RS, jointly with demodulation reference signals, DM-RS, the wireless device comprising:

a DM-RS scheduling module configured to schedule the DM-RS in a time-frequency resource grid at a plurality of frequencies in a same time slot; and a PT-RS scheduling module configured to schedule the PT-RS in the time-frequency grid at a plurality of time slots at a same frequency, the time slots at which the PT-RS are scheduled depending on a position of the DM-RS.

| Abbreviation Explanation | |
|---|---|
| 3GPP | Third Generation Partnership Project |
| eNB | Enhanced NodeB |
| CRS | Cell-Specific Reference Signal |
| DM-RS | De-Modulation Reference Signal |
| DCI | Downlink Control Information |
| LTE | Long Term Evolution |
| MIMO | Multiple Input Multiple Output |
| PT-RS | Phase Tracking Reference Signal |
| RS | Reference Signal |
| TM | Transmission Mode |
| TTI | Transmission Time Interval |
| UE | User Equipment |
| URLLC | Ultra-reliable low latency communications |
| WD | Wireless Device |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for use in a wireless device in a wireless communication system for transmitting a phase-tracking reference signal, PT-RS, the method comprising:
    obtaining information about a position in a time domain of a scheduled first demodulation reference signal, DM-RS, symbol in a slot;
    obtaining information about a position of a first time symbol in the slot scheduled for data transmission;
    obtaining information about a position of a last time symbol in the slot scheduled for data transmission;
    obtaining information about the PT-RS density;
    mapping of PT-RS symbols to resource elements, REs, within the slot based on an equation determined by the obtained information about the position in the time domain of the scheduled first DM-RS symbol in the slot, the position of the first time symbol in the slot scheduled for data transmission, the position of the last time symbol in the slot scheduled for data transmission, and the PT-RS density; and transmitting PT-RS symbols within the slot.

2. The method of claim 1, wherein the obtaining comprises one of receiving information about and determining the position in the time domain of the scheduled first DM-RS symbol.

3. The method of claim 1, further comprising:
obtaining information indicating a scheduled modulation and coding scheme, MCS; and
transmitting the PT-RS with a time density based on the scheduled MCS.

4. The method of claim 3, wherein the time density is one of 1, ½ and ¼.

5. The method of claim 1, further comprising:
mapping the PT-RS to resource elements, REs, in the slot based on, a scheduled MCS.

6. The method of claim 1, wherein the first scheduled DM-RS symbol is scheduled in resource elements, REs, which span a plurality of subcarriers in frequency and at least one time symbol of the slot in time, while the PT-RS is one of transmitted and received in REs which span at least one subcarrier in frequency and multiple time symbols of the slot in time.

7. The method of claim 1, wherein a physical resource block, PRB, of the slot has 12 subcarriers in a frequency domain and one of 12 and 14 time symbols in the time domain.

8. A wireless device in a wireless communication system configured for one of transmitting and receiving a phase tracking-reference signal, PT-RS, the wireless device comprising:
processing circuitry configured to:
obtain information about a position in a time domain of a scheduled first demodulation reference signal, DM-RS, symbol in a slot;
obtain information about a position of a first time symbol in a slot scheduled for data transmission;
obtain information about a position of a last time symbol in the slot scheduled for data transmission;
obtain information about the PT-RS density; and,
map PT-RS symbols to resource elements, REs, within the slot based on an equation determined by on the obtained information about the position in the time domain of the scheduled first DM-RS symbol in the slot, the position of the first time symbol in the slot scheduled for data transmission, the position of the last time symbol in the slot scheduled for data transmission, and the PT-RS density; and
transmit PT-RS symbols within the slot.

9. The wireless device of claim 8, wherein the obtaining comprises one of receiving and determining information about the position in the time domain of the scheduled first DM-RS symbol.

10. The wireless device of claim 8, wherein the processing circuitry is further configured to:
obtain information indicating a scheduled modulation and coding scheme, MCS; and
transmit the PT-RS with a time density based on the scheduled MCS.

11. The wireless device of claim 10, wherein the time density is one of 1, ½ and ¼.

12. The wireless device of claim 8, wherein the processing circuitry is further configured to:
map the PT-RS to resource elements, REs, in the slot based on, a scheduled MCS.

13. The wireless device of claim 8, wherein the scheduled first DM-RS symbol is scheduled in resource elements, REs, which span a plurality of subcarriers in frequency and at least one time symbol of the slot in time, while the PT-RS is one of transmitted and received in REs which span at least one subcarrier in frequency and multiple time symbols of the slot in time.

14. The wireless device of claim 8, wherein a physical resource block, PRB, of the slot has 12 subcarriers in a frequency domain and one of 12 and 14 time symbols in the time domain.

* * * * *